(12) United States Patent
Hu et al.

(10) Patent No.: US 8,804,511 B2
(45) Date of Patent: *Aug. 12, 2014

(54) POLICY-ENABLED DYNAMIC DEEP PACKET INSPECTION FOR TELECOMMUNICATIONS NETWORKS

(71) Applicant: AT&T Mobility II LLC, Atlanta, GA (US)

(72) Inventors: Qingmin James Hu, Sammamish, WA (US); Megan Klenzak, Atlanta, GA (US); Paul Smith, Rockwall, TX (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/679,713

(22) Filed: Nov. 16, 2012

(65) Prior Publication Data

US 2013/0070593 A1    Mar. 21, 2013

Related U.S. Application Data

(63) Continuation of application No. 11/611,459, filed on Dec. 15, 2006, now Pat. No. 8,331,229.

(51) Int. Cl.
    *G06F 11/00*    (2006.01)
(52) U.S. Cl.
    USPC ........ 370/230; 370/230.1; 370/232; 370/233; 370/234

(58) Field of Classification Search
    USPC ............ 370/230, 230.1, 232, 233, 234; 726/1
    See application file for complete search history.

(56) References Cited

U.S. PATENT DOCUMENTS

| 7,472,180 | B2 | 12/2008 | Dini et al. | |
|---|---|---|---|---|
| 2006/0233101 | A1* | 10/2006 | Luft et al. | 370/229 |
| 2007/0112914 | A1 | 5/2007 | Sung et al. | |
| 2008/0120413 | A1 | 5/2008 | Mody et al. | |
| 2009/0201808 | A1* | 8/2009 | Bettink et al. | 370/230 |

OTHER PUBLICATIONS

"3GPP Technical Specification Group Services and System Aspects; Policy and Charging Control Architecture", TS 23.203 V7.3.0 (Jun. 2007).

* cited by examiner

*Primary Examiner* — Omer S Mian
(74) *Attorney, Agent, or Firm* — Parks IP Law LLC; Mickki D. Murray, Esq.

(57) ABSTRACT

Provided herein is a method including the steps of: establishing at least one policy in a centralized policy management framework (PMF), wherein the policy includes at least one policy condition; monitoring data traffic; determining if the data traffic at least substantially meets one of the policy conditions; sending a trigger to the PMF, if at least one of the policy conditions is at least substantially met; generating an enforcement decision at the PMF, wherein the enforcement decision includes at least one enforcement action; sending the enforcement decision to an enforcement function; and enforcing the enforcement decision. A system for realizing this method is also provided.

14 Claims, 3 Drawing Sheets

POLICY-ENABLED DYNAMIC DEEP PACKET INSPECTION FOR TELECOMMUNICATIONS NETWORKS

TECHNICAL FIELD

The present invention relates generally to deep packet inspection and, more particularly, to policy-enabled dynamic deep packet inspection for telecommunications networks.

BACKGROUND OF THE INVENTION

Deep packet inspection (DPI) is a type of packet filtering performed at the application layer, which takes into account packet payload data to determine the permissibility of a through-passing packet. DPI can utilize a variety of techniques such as, for example, standards compliance, protocol anomaly detection, malicious data detection, application control, signature matching, and behavior-based inspection along with traditional packet inspection techniques (i.e., source/destination Internet Protocol (IP) addresses and ports), to identify and classify data packets in order to obtain end-to-end visibility of the packet traffic traversing a network. Armed with this information operators can implement policies (e.g., quality of service (QoS) policies) to ensure subscribers are provided the level of service to which they are entitled. Accordingly, actions can be taken to properly enforce these policies. Actions can include, for example, allowing, blocking, destroying, rate limiting, and flagging a suspect packet or packet stream.

Traditionally, DPI is deployed in IP data networks for security and network operation purposes. For wireless networks, in addition to what traditional functionalities DPI provides, operators need to have the abilities to manage data services to avoid abuse of network resources. This need requires the ability to detect, analyze, and shape data traffic, and accordingly enforce policies for QoS and/or operator-dependent purposes. Due to the development of newer wireless communications equipment and the development of more sophisticated processing techniques, users can enjoy higher bandwidth connections to wireless networks via their wireless operator. More recently, with the advent of high-speed data access protocols such as Evolution-Data Optimized (EV-DO), High-Speed Downlink Packet Access (HSDPA), High-Speed Uplink Packet Access (HSUPA), and High-Speed Orthogonal Frequency-Division Multiplexing (OFDM) Packet Access (HSOPA), users have gained the ability to transfer large amounts of data, such as to implement file sharing, download movies, and/or download music files. The accessibility and widespread use of mobile devices (e.g., mobile telephones, personal digital assistants (PDAs), smart devices, and laptop computers) increases the vulnerability of the wireless network to bandwidth abuse, security, and legal issues associated with the use (misuse) of the network.

Current DPI architectures for wireless networks incorporate policy management systems for provisioning and managing static policies. These systems provide no means for dynamically updating or creating new policies based upon analysis provided during DPI processes. In addition, these architectures are inflexible with regard to phased development and typically burden the policy enforcement point with the responsibilities of constantly monitoring traffic for enforcement conditions.

These and other deficiencies in the state of the art of DPI are addressed and overcome by the various exemplary embodiments provided herein.

SUMMARY OF THE INVENTION

The various embodiments of the present invention overcome the deficiencies of the prior art by providing a system and method for packet filtering. An exemplary method according to the present invention includes the steps of: establishing at least one policy in a centralized policy management framework (PMF), the policy including at least one policy condition; monitoring data traffic; determining if the data traffic at least substantially meets one of the at least one policy conditions; sending a trigger to the PMF, if at least one of the policy conditions is at least substantially met; generating an enforcement decision at the PMF, the enforcement decision including at least one enforcement action; sending the enforcement decision to an enforcement function; and enforcing the enforcement action.

A system for executing the above method is also provided. The exemplary system includes a PMF for managing policies, the policies each including at least one policy condition; a traffic analyzer for monitoring data traffic and determining if the data traffic at least substantially meets one of the policy conditions; the traffic analyzer further configured for sending a trigger to the PMF, if at least one of the policy conditions is at least substantially met; the PMF being further configured for generating an enforcement decision, the enforcement decision including at least one enforcement action; and for sending the enforcement decision to an enforcement function, the enforcement function being configured to enable said enforcement action.

The foregoing has broadly outlined some of the aspects and features of the present invention, which should be construed to be merely illustrative of various potential applications of the invention. Other beneficial results can be obtained by applying the disclosed information in a different manner or by combining various aspects of the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

DETAILED DESCRIPTION OF THE INVENTION

As required, detailed embodiments of the present invention are disclosed herein. It must be understood that the disclosed embodiments are merely exemplary of the invention that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

The present invention employs the use of a centralized policy management framework (PMF) as described in a filed patent application Ser. No. 11/533,302 to the same Assignee, the specification of which is incorporated herein by reference. To summarize, the PMF provides policy-enabled services and in accordance with the present invention provides a policy-enabled solution for DPI. The term policy, in the singular and the plural, is a widely interpreted word with many different definitions and meanings. Accordingly, for the avoidance of doubt, herein "policy" and "policies" include a set of one or more rules that a network operator can define and enforce in a telecommunications network.

In addition to policies used for purposes of implementing and practicing the present invention, the PMF can include policies related to other service management issues. The PMF manages policies for a variety of services so that a network operator has the ability to provision, validate, and correlate policies in a centralized manner. With respect to the present invention, the PMF manages, provisions, validates, and correlates policies for use with a DPI component. An exemplary PMF is described with respect to FIG. 1.

Figure 1:
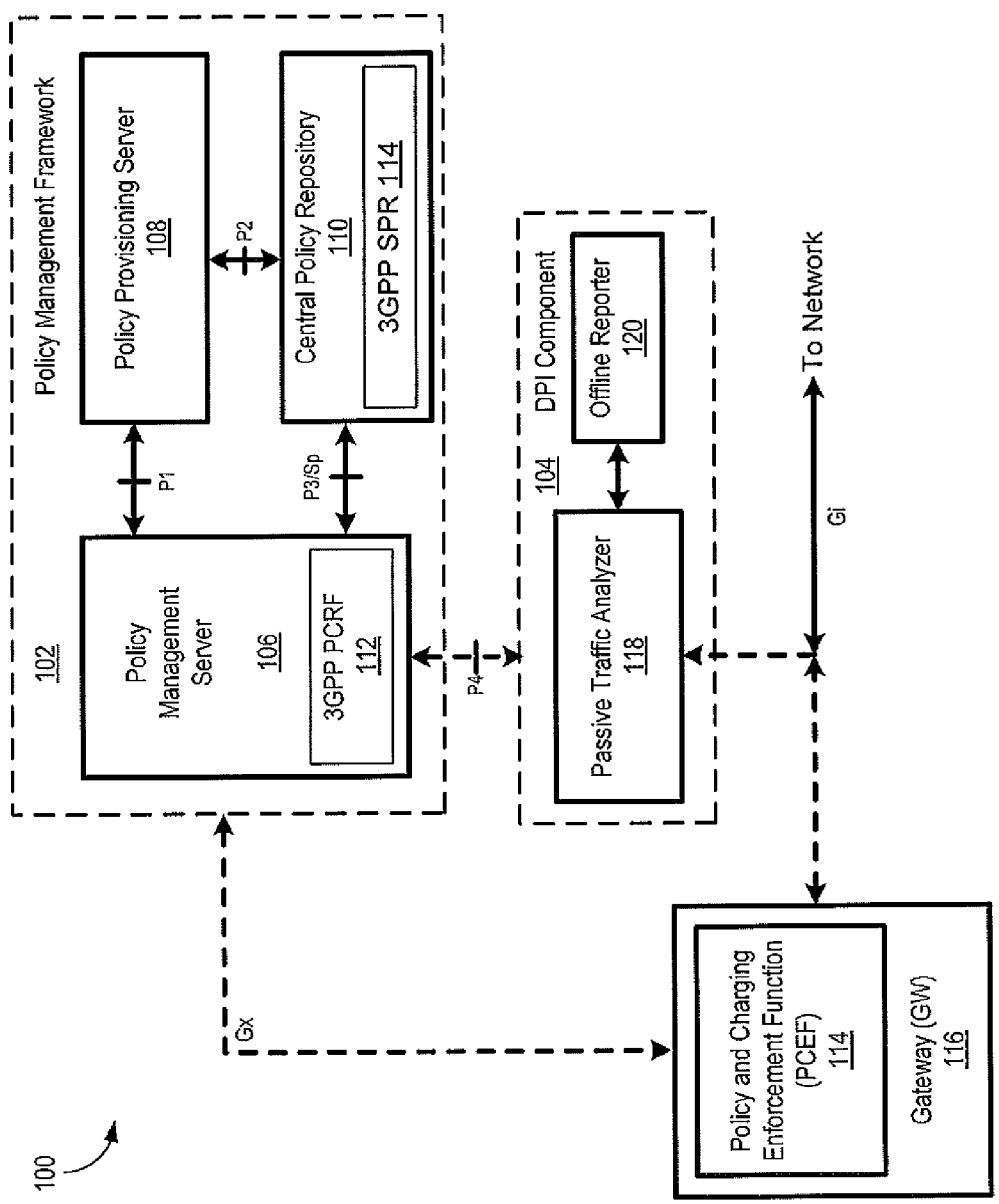
FIG. 1 illustrates an exemplary policy enabled dynamic deep packet inspection (DPI) system, according to the present invention.

Referring to the drawings in which like numerals represent like elements throughout the several views, FIG. 1 illustrates a policy-enabled deep packet inspection (DPI) system 100, according to the present invention. The illustrated policy-enabled DPI system 100 includes two main components; namely, a policy management framework 102 and a DPI component 104. The illustrated PMF 102 includes, but is not limited to three main components: a policy management server (PMS) 106, a policy provisioning server (PPS) 108, and a central policy repository (CPR) 110. As utilized herein, P1 refers to interface communications between the PMS 106 and the PPS 108, P2 refers to interface communications between the PPS 108 and the CPR 110, and P3/Sp refers to interface communications between the CPR 110 and the PMS 106.

In some embodiments, the PMS 106 acts as a Policy Decision Function (PDF) and also a policy manager for managing predefined network operator policies such as, for example, policy validation, redundancy check, policy chaining, access control for provisioning server, and the like. In the present invention, policies are related to the enforcement of traffic rules to shape traffic and/or to sustain QoS for subscribers. The PMS 106 may be implemented as, or include, a policy control and charging rules function (PCRF) 112 as defined by the 3$^{rd}$ Generation Partnership Project's (3GPP's) Technical Specification Group Services and System Aspects, entitled "Policy and Charging Control Architecture; Release 7" and identified as 3GPP TS 23.203 V1.0.0 (2006-05)" (the "3GPP R7 PCC" specification).

In some embodiments, the PPS 108 is responsible for policy provisioning, including syntax check, policy parsing and cataloging, policy conflict resolution, precedence setting, SLA management, and the like. The CPR 110 stores all policy data as a centralized storage abstraction (i.e., centralized from the perspective of requesting applications and services even if some data is referenced). The CPR 110 may be implemented as, or includes, a subscription profile repository (SPR) 114, as defined in the 3GPP R7 PCC specification. The SPR 114 includes all subscriber/subscription related information needed for subscription-based policies and IP-CAN bearer level charging rules by the PCRF 112. The SPR 114 may be combined with or distributed across other databases in the operator's network. SPR 114 may provide the following information including, but not limited to: Subscriber's allowed services, Information on subscriber's allowed QoS, Subscriber's charging related information, and Subscriber category.

The PMF 102 (in particular the PCRF 112) is in communication, via a Gx interface, with a policy and charging enforcement function (PCEF) 114 residing on a gateway (GW) 116. The GW 116 can be embodied, for example, in a gateway generic packet radio service (GPRS) support node (GGSN). The Gx interface enables the PCRF 112 to have dynamic control over the policy and charging control (PCC) behavior at the PCEF 114. In addition, the Gx interface enables the signaling of PCC decisions, which govern the PCC behavior, supporting, but not limited to, the following functions: (1) initialization and maintenance of connection, (2) request for PCC decision from the PCEF 114 to PCRF 112, (3) provision of PCC decision from PCRF 112 to PCEF 114 and (4) indication of IP-Connectivity Access Network (IP-CAN) termination (from PCEF 114 to PCRF 112).

The P3/Sp interface lies between the CPR 110/SPR 114 and the PCRF 112. The P3/Sp interface allows the PCRF 112 to request subscription information from the SPR 114 based on a subscriber ID. The interface allows the SPR 114 to notify the PCRF 112 when the subscription information has been changed if the PCRF 112 has requested such notifications.

The PMF 102 is in communication with the DPI component 104 via a P4 interface. The DPI component 104 can be passive and used for customer QoS, traffic analysis, traffic reporting, and/or intelligence gathering. The P4 interface allows policy conditions and rules to be shared between the DPI component 104 and the PMF 102. In addition, when certain policy conditions or rules are met with regard to a monitored traffic flow, a trigger is sent to the PMF 102 which determines (based upon a number of policies), an appropriate enforcement method such as to allow or disallow certain traffic or to give certain traffic a particular amount of bandwidth. The enforcement method is then sent to the PCEF 114 where the method can be executed.

The illustrated DPI component 104 includes a traffic analyzer 118 and an offline reporter 120. These elements perform traffic analysis and reporting functions, respectively.

It should be understood that although one can deploy traffic monitoring and enforcement functions on the same network element, it is not desirable to do so in the wireless network because of performance and efficiency considerations. Accordingly, the present invention separates the traffic detection element (DPI component 104) and the traffic enforcement element (PCEF 114) to increase performance and efficiency. Further, the present invention implements the P4 interface to communicate policies and traffic analysis information between the DPI component 104 and the PMF 102 such that appropriate enforcement action(s) can be taken.

Figure 2:
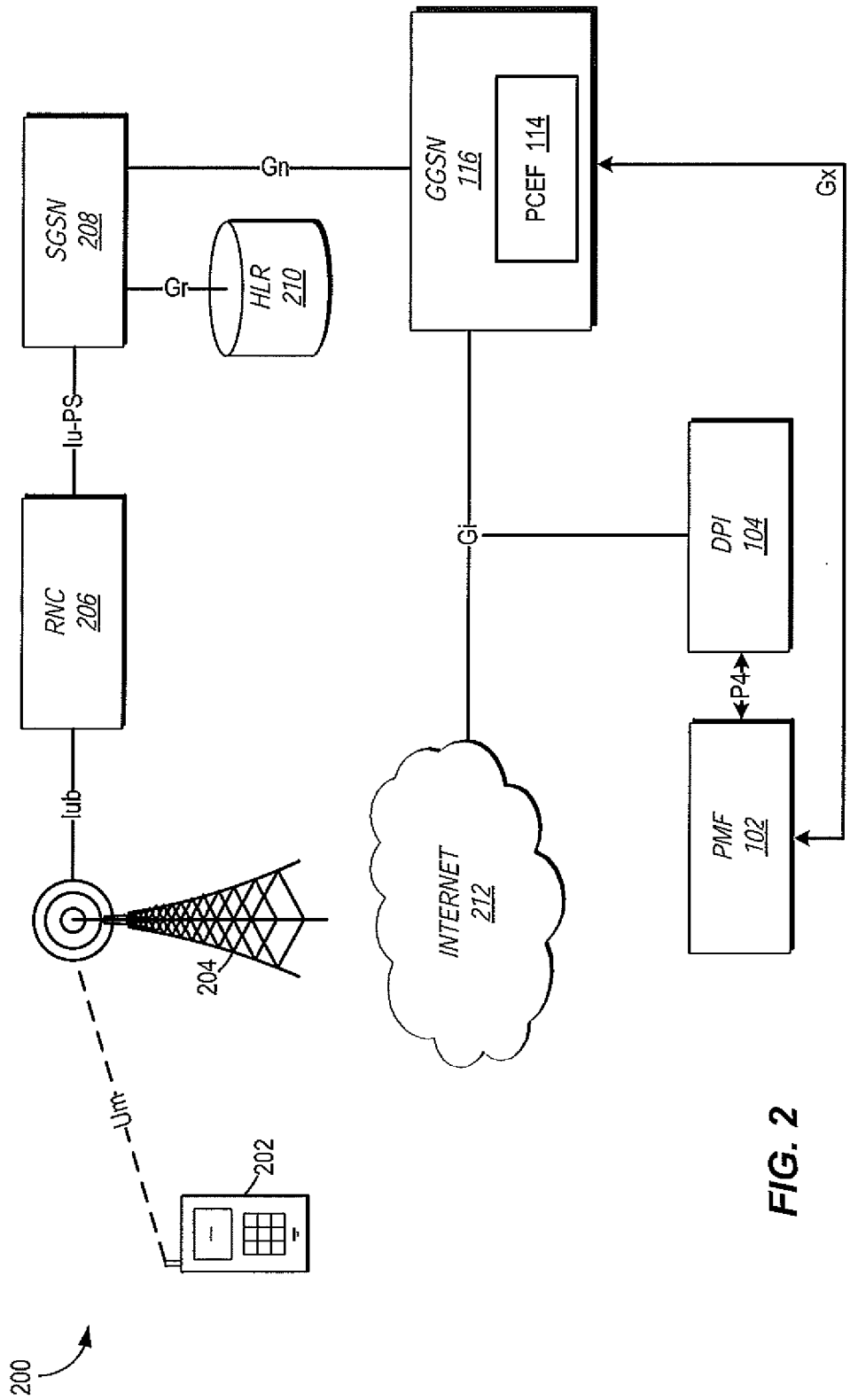
FIG. 2 illustrates an exemplary communications network, according to the present invention.

Referring now to FIG. 2, an exemplary communications system 200 is shown, according to the present invention. The illustrated communications system 200 employs the PMF 102, DPI 104, and PCEF 114 components of FIG. 1. The illustrated communications system 200 includes a Universal Mobile Telecommunications System (UMTS) Terrestrial Radio Access Network (UTRAN). It should be understood that other radio access networks may be used as an alternative to the UTRAN. The UTRAN can carry various types of communication traffic including circuit-switched traffic and packet-switched traffic. Also, the UTRAN can carry data in accordance with any means for wireless data communications such as, but not limited to, Circuit-Switched Data (CSD), General Packet Radio Service (GPRS), High-Speed Circuit-Switched Data (HSCSD), Enhanced GPRS (EGPRS), Evolution-Data Optimized (EV-DO), High-Speed Downlink Packet Access (HSDPA), High-Speed Uplink Packet Access (HSUPA), High-Speed Orthogonal Frequency-Division Multiplexing (OFDM) Packet Access (HSOPA), or combinations, variations, and/or improvements thereof, and the like. In this regard, the techniques of the invention may be applied independently of the method of data transport, and does not depend on any particular network architecture, or underlying protocols.

The illustrated communications system 200 includes at least one user equipment (UE) 202 in communication with at least one Node-B 204 via a Um interface. The UE 202 can include a mobile communications device such as a cellular telephone, Personal Digital Assistant (PDA), a laptop computer, a notebook computer, a tablet computer, or any combination thereof, and the like. The Node-B 204, in turn, is in communication with at least one Radio Network Controller (RNC) 206 via an Iub interface. The Node-B 204 and the RNC 206 can be implemented as separate network elements or as the same network element. As is known in the art, the RNC 206 provides control functions for each associated Node-B 204. As is also known in the art, the Node-B 204 is a base station that can includes equipment such as a radio tower, which enables the Um interface for communication between the Node-B 204 and the UE 202.

The RNC 206 is also in communication with a Serving General Packet Radio Service (GPRS) Support Node (SGSN) 208 via an Iu-PS interface. The SGSN 208, in turn, is in communication with a Home Location Register (HLR) 210 via a Gr interface and a Gateway GPRS Support Node (GGSN) via a Gn interface. The SGSN 208 performs functions known in the art such as location tracking for the UE 202, security functions, and access control. An HLR, as is known in the art, is configured to store subscriber information for services and features provided by a wireless service provider and location area based information. The illustrated GGSN 116 (GW) performs IP routing functions and policy and charging functions related to the PCEF 114.

The GGSN 116 is also in communication with a Public Data Network (PDN) such as, for example, the Internet 212 via a Gi interface. A PDN is a network established and operated by a telecommunications administration, or a recognized private operating agency, for the specific purpose of providing data transmission service for the public. Thus, the GGSN 116 provides interworking functionality with external PDNs, and sets up a logical link to the UE 202 through the SGSN 208. When packet switched data leaves the UTRAN, it is transferred to an external Transfer Control Protocol-Internet Protocol (TCP-IP) network such as the Internet 212 or an X.25 network. To access GPRS services, the UE 202 first attaches itself to the UTRAN by performing an attach procedure. The UE 202 then activates a Packet Data Protocol (PDP) context, thus activating a packet communication session between the UE 202, the SGSN 208, and the GGSN 116.

The DPI component 104 is tapped into the Gi interface to monitor data traffic. The DPI component 104 receives policy conditions, via the P4 interface, to enable the DPI component 104 to monitor data while taking into account policies provided by the PMF 102. The policies can be dynamically changed based upon changing characteristics of the data traffic and/or the associated subscribers. The PMF 102 is also in communication with the PCEF 114. The PMF 102 is configured to receive a trigger from the DPI component 104 when one or more policy conditions are met. The trigger initiates a process within the PMF 102 to determine which enforcement policies should be used to prevent or at least restrict future data traffic associated with, for example, the same subscriber.

It should be understood that although one can deploy traffic monitoring and enforcement functions on the same network element, it is not desirable to do so in the wireless network because of performance and efficiency considerations. Accordingly, the present invention separates the traffic detection element (DPI component 104) and the traffic enforcement element (PCEF 114) to increase performance and efficiency.

Figure 3:
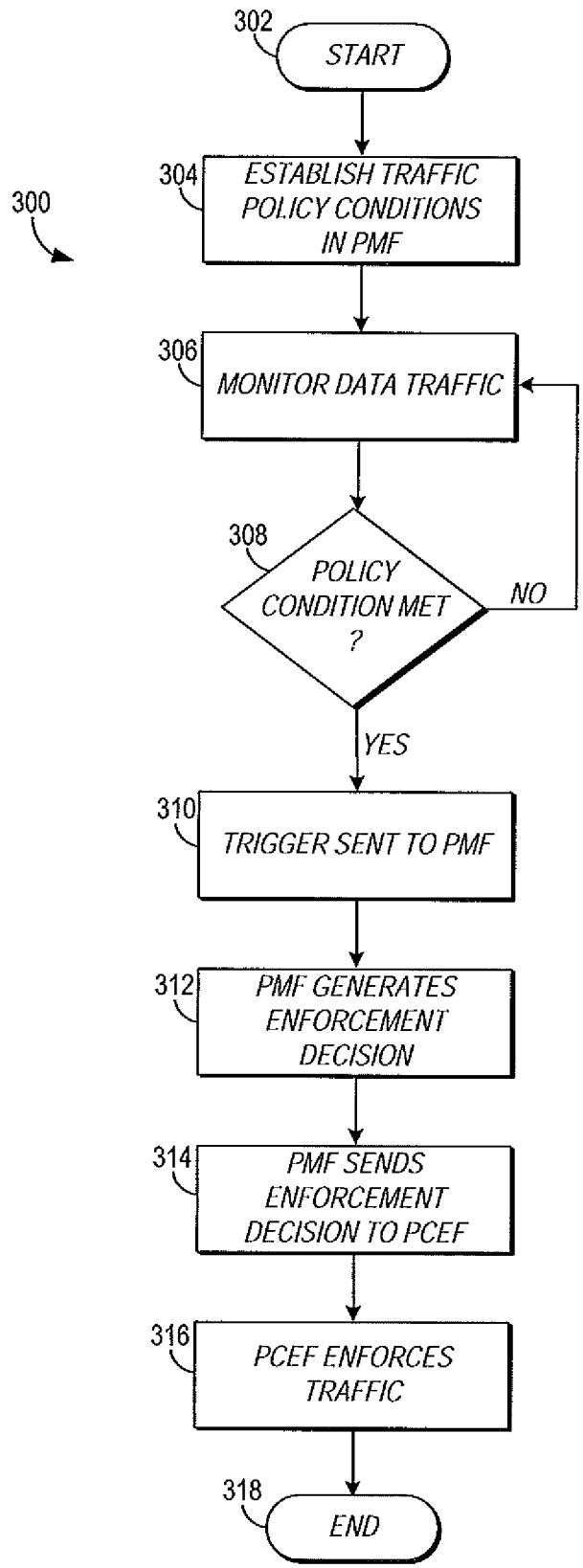
FIG. 3 illustrates an exemplary method for using the system of FIG. 1, according to the present invention.

Referring now to FIG. 3, an exemplary method 300 for practicing the present invention is shown. The method 300 begins at block 302 and proceeds to block 304, wherein the PMF 102 establishes traffic policy conditions for the data traffic. These policies can be associated with the subscriber through, for example, subscriber data stored in the SPR 114.

At block 306, the traffic analyzer 118 monitors the data traffic. The traffic analyzer 118 is additionally made aware of any pre-existing policy conditions or rules that are to be applied to the monitored traffic. At block 308, if the traffic analyzer 118 detects that one or more of the policy conditions or rules have been met, then the method 300 proceeds to block 310 and a trigger is sent to the PMF 102 to indicate an enforcement action is needed. This offloading of the enforcement functions to a separate element alleviates much of the processing power that would typically be needed for a combined element that incorporates the functionality of both a monitoring element and an enforcement element. If at least one policy condition or rule is not met, then the traffic analyzer 118 continues to monitor the data traffic.

At block 312, the PMF 102 determines the appropriate enforcement action based upon the characteristics of the data traffic under scrutiny. The enforcement action can be used to shape the data traffic via the PCEF 114. Traffic shaping, as used herein, is an attempt to control data traffic in order to optimize or guarantee performance, low latency, and/or bandwidth. This can be accomplished, for example, by the application of one or more policies, blocking ports, and/or by other traffic shaping methods known to those skilled in the art.

Alternatively or in addition, the enforcement action can include an account closure, a warning message such as a short message service (SMS) message, and enhanced message service (EMS) message, a multimedia message service (MMS) message, an email message, a letter, and the like; restriction of the abused service (e.g., mobile Internet access), cancellation of the abuses service, other enforcement action deemed appropriate by the wireless service provider, or any combination thereof, and the like.

The above restriction policies can be dictated by several factors including, but not limited to, a subscriber's bandwidth abuse history. If a subscriber shows improvement in his/her bandwidth abuse, a restriction policy can be lifted.

At block 314, the PMF 102 sends the enforcement action to the PCEF 114 for enforcement at block 316. The method 300 then ends at block 318.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A method, for managing communications network resources using a policy management framework, comprising:

communicating, by the policy management framework, a policy condition, stored at a policy repository of the policy management framework, from the policy management framework to a deep packet inspection component being separate from and in communication by way of a P4 interface with the policy management framework; and performing, in response to the deep packet inspection component monitoring data traffic using the policy condition and determining that the policy condition is satisfied, operations comprising:

receiving, by the policy management framework, from the deep packet inspection component, being separate from the policy management framework, a trigger communication, the trigger communication comprising an indication that the policy condition has been satisfied based on results of the monitoring; and generating, by the policy management framework, in response to receiving the trigger communication from the deep packet inspection component, an enforcement decision comprising an enforcement action for execution by an enforcement function, wherein:

the deep packet inspection component is part of a first network element and comprises a first processing resource;

the enforcement function is implemented by a network gateway component;

the network gateway component is implemented as a gateway general packet radio service support node;

the gateway packet radio service support node is:

(i) part of, to accomplish performance benefits, and to accomplish efficiency benefits, a second network element being distinct from the first network element; and (ii) in communication via a Gx interface with the policy management framework; and the enforcement action comprises a characteristic selected from a group of characteristics consisting of:

a warning message communicated to an address associated with a user account;

an account closure, closing the user account; and a financial charge to the user account for one or more services.

2. The method of claim 1, wherein the operations further comprise sending, by the policy management framework, the enforcement action to the enforcement function of the network gateway component.

3. The method of claim 2, further comprising enforcing, by the enforcement function of the network gateway component, the enforcement action.

4. The method of claim 1, wherein the data traffic comprises Internet Protocol traffic.

5. The method of claim 1, wherein the enforcement action is used to shape future data traffic.

6. The method of claim 1, wherein:

the deep packet inspection component is in operative communication with the network gateway component, including the enforcement function, via a first interface being distinct from both the Gx and P4 interfaces.

7. The method of claim 1, wherein the network gateway component is further configured to perform Internet Protocol routing functions.

8. A non-transitory computer-readable storage device comprising computer-executable instructions that, when executed at a policy management framework of a communications network, cause the policy management framework to perform operations comprising:

storing, by a policy repository of the policy management framework, a policy condition;

communicating the policy condition from the policy management framework to a deep packet inspection component in communication with the policy management framework; and in response to the deep packet inspection component determining, by way of monitoring, that the policy condition is satisfied:

receiving, by the policy management framework, from the deep packet inspection component a trigger communication, wherein:

the deep packet inspection component has a processing resource being separate from, and in communication by way of a P4 interface with, a processing resource of the policy management framework; and the trigger communication comprises an indication that the policy condition has been satisfied based on results of the monitoring;

recognizing the trigger communication received as an indication that the policy condition has been satisfied; and generating, in response to receiving the trigger communication from the deep packet inspection component, an enforcement decision comprising an enforcement action for execution by an enforcement function, wherein:

the deep packet inspection component is part of a first network element and comprises a first processing resource;

the enforcement function is implemented by a network, gateway component;

the network, gateway component is implemented as a gateway, general packet radio service support node;

the, gateway packet radio service support node is:

(i) part of, to accomplish performance benefits, and to accomplish efficiency benefits, a second network element being distinct from the first network element; and (ii) in communication via a Gx interface with the policy management framework; and the enforcement action comprises a characteristic selected from a group of characteristics consisting of:

a warning message communicated to an address associated with a user account;

an account closure, closing the user account; and a financial charge to the user account for one or more services.

9. The non-transitory computer-readable storage device of claim 8, wherein the operations further comprise sending to the enforcement function, of the network gateway component, in communication with the policy management framework, the enforcement action.

10. The non-transitory computer-readable storage device of claim 9, wherein:

the deep packet inspection component is in operative communication with the network gateway component, including the enforcement function, via a first interface being distinct from both the Gx and P4 interfaces.

11. A policy management framework system, for managing policies including a policy condition, comprising: a processor; and a computer-readable storage medium being in operative communication with the processor and having computer-executable instructions that, when executed by the processor, cause the processor to perform operations comprising:
generating, in response to receiving a trigger communication from a deep packet inspection component, an enforcement decision, the enforcement decision comprises an enforcement action, wherein:
the deep packet inspection component has a processing resource being separate from, and in communication by way of a P4 interface with, the processor of the policy management framework;
the trigger communication has been sent to the policy management framework in response to the deep packet inspection component having determined, in monitoring data traffic using the policy condition, that the data traffic satisfied the policy condition; and
sending the enforcement decision to an enforcement function for execution of the enforcement action, wherein:
the deep packet inspection component is part of a first network element and comprises a first processing resource;
the enforcement function is implemented by a network gateway component;
the network, gateway component is implemented as a gateway general packet radio service support node;
the gateway packet radio service support node is:
(i) part of, to accomplish performance benefits, and to accomplish efficiency benefits, a second network element being distinct from the first network element; and
(ii) in communication via a Gx interface with the policy management framework; and
the enforcement action comprises a characteristic selected from a group of characteristics consisting of:
a warning message communicated to an address associated with a user account;
an account closure, closing the user account; and
a financial charge to the user account for one or more services (iii).

12. The system of claim 11, wherein:
the deep packet inspection component is in operative communication with the network gateway component, including the enforcement function, via a first interface being distinct from both the Gx and P4 interfaces.

13. The system of claim 11, wherein:
the policy management framework is in operative communication with the deep packet inspection component via a first interface;
the policy management framework is in operative communication with the network gateway component via a second interface being distinct from the first interface; and
the deep packet inspection component is in operative communication with the network gateway component, including the enforcement function, via a third interface being distinct from both the first and second interfaces.

14. The system of claim 11, wherein the network gateway component is further configured to perform internet Protocol routing functions.

* * * * *